Figure 1A:
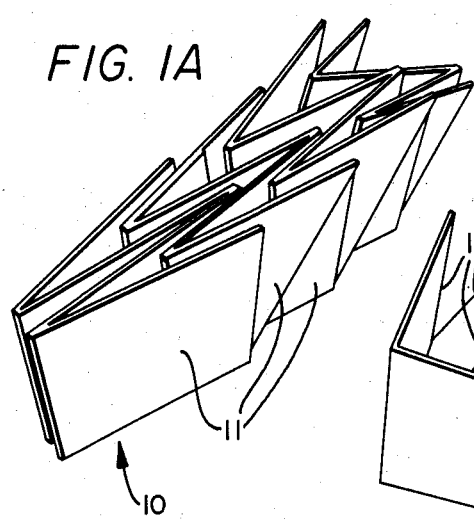

United States Patent [19]

Siegler

[11] Patent Number: 4,727,920

[45] Date of Patent: Mar. 1, 1988

[54] COMPACT FOLD WINDSHIELD SUNSHADE

[76] Inventor: Lawerence D. Siegler, 3827 Vinecrest Dr., Dallas, Tex. 75229

[21] Appl. No.: 26,544

[22] Filed: Mar. 17, 1987

[51] Int. Cl.⁴ ............................................. A47H 5/00
[52] U.S. Cl. ............................ 160/84 R; 160/DIG. 3; 296/97 E; 493/405
[58] Field of Search ........ 160/84 R, DIG. 2, DIG. 3, 160/107; 296/97 E; 493/405

[56] References Cited

U.S. PATENT DOCUMENTS

| | | | |
|---|---|---|---|
| 3,003,812 | 10/1961 | Haugland | 160/84 R X |
| 4,202,396 | 5/1980 | Levy | 160/84 R X |
| 4,647,102 | 3/1987 | Ebrahimzadeh | 160/DIG. 2 X |
| 4,652,039 | 3/1987 | Richards | 296/97 E X |
| 4,671,334 | 6/1987 | Yadegar et al. | 160/84 R |
| 4,671,558 | 6/1987 | Cline | 296/97 E X |

*Primary Examiner*—Ramon S. Britts
*Assistant Examiner*—David M. Purol
*Attorney, Agent, or Firm*—Warren H. Kintzinger

[57] ABSTRACT

A windshield sunshade for placement behind the windshield of an automobile, truck, boat or other vehicle that blocks and reflects hot radiation from the sun that otherwise greatly overheats a vehicle interior during hot sunny days. The sunshade is made up of connected and hinged planar parallelograms each having spaced parallel side edges but with the vertically extended edges at an angle relative to the generally horizontal upper and lower edges other than perpendicular. Other than at overall sunshade outer side edges and top and bottom edges the parallelograms are joined in horizontal tiers and side by side in vertical columns. There is a top center cut out to accomodate rear view mirror structure with part of the windshield sunshade still positionable to extend between the back of the rear view mirror and the windshield. The vertically tiered and joined parallelogram structure of heavy paper, plastic or cardboard lends itself to being folded and unfolded, as needed, between a very compact storage state to an expanded use state with the parallelogram structure expandable and contractable to fit window positions and snappable through a flat planar state between joined parallelogram segments to a reverse crease bent position holding state.

12 Claims, 5 Drawing Figures

COMPACT FOLD WINDSHIELD SUNSHADE

This invention relates in general to sunshields placeable behind the windshield of a vehicle, and more particularly, to a sunshield of a multiplicity of connected and hinged planar parallelogram panels in tiers and columns expandable to the installed state and foldable to a compact storage state.

There are many different sunshields and sunshades available for vehicles with some permanently or semi permanently installed or mounted to be positioned as required. Such units are generally quite expensive and are not intended to be foldable for compact storage. Some of the seasonably useable or temporary sunshields have installation positioning problems with being used day after day and subject to being removed and repositioned in place sometimes many times a day, and while foldable for storage they may still be bulkier than desired for convenient storage. Further, some of the earlier sunshades had relatively short service lives with minimal stress relief between joined sections and with joint splitting particularly with the drying effect of elevated temperatures in sunlight.

It is therefore a principal object of this invention to provide an inexpensive yet effective efficient sunshade for use behind vehicle windshields.

Another object is to provide such a sunshade that is easily expanded into place behind a windshield and easily folded for storage.

A further object is for such a sunshade to be folded to a relatively small compact package for storage.

Still another object is to provide a multi-joined planar parallelogram sunshade expandable and contractable to fit window positions snappable through a flat planar state between joined parallelogram segments to a reverse crease bent position holding state.

Features of the invention useful in accomplishing the above objects include, in a compact fold windshield sunshade, a sunshade shaped and sized for placement behind the windshield of a vehicle to block and reflect hot radiation from the sun that otherwise greatly overheats a vehicle interior including car seats, steering wheel, shift lever, dash top and other internal appointments of a vehicle during hot sunny days. The sunshade is made up of connected and hinged planar parallelograms each having spaced parallel side edges but with the vertically extended edges at an angle relative to the generally horizontal upper and lower edges rather than being perpendicular thereto Other than at overall sunshade outer side edges and top and bottom edges the parallelograms are joined in horizontal tiers and side by side in vertical columns. There is a top center cut out to accomodate rear view mirror structure with part of the windshield sunshade still positionable to extend up between the back of the rear view mirror and the windsield. The vertically tiered and joined parallelogram structure of heavy paper, plastic or cardboard lends itself to being folded and unfolded, as needed, between a very compact storage state to an expanded use state with the parallelogram structure expandable and contractable to fit window positions and snappable through a flat planar state between joined parallelogram segments to a reverse crease bent position holding state.

A specific embodiment representing what is presently regarded as the best mode of carrying out the invention is illustrated in the accompanying drawings.

Figure 1B:
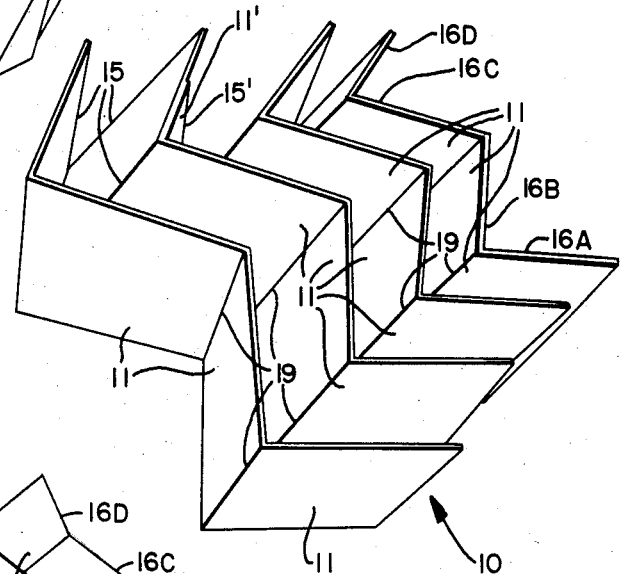
Figure 1C:
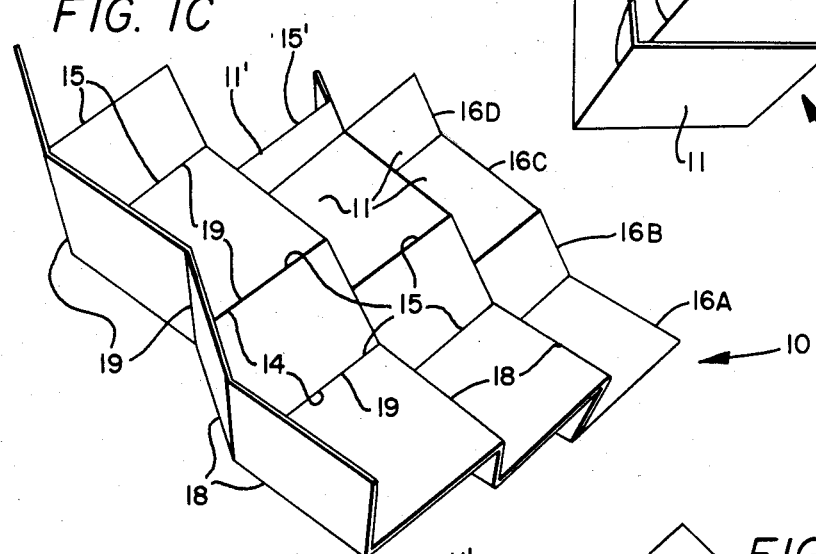
Figure 1D:
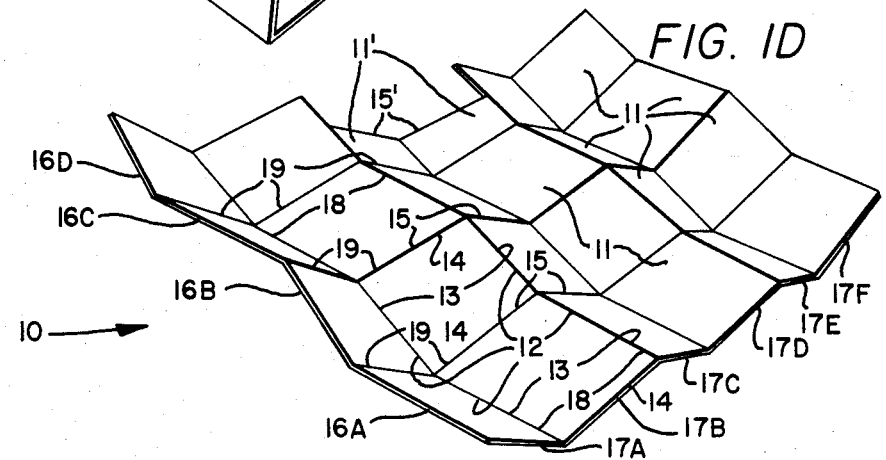
Figure 2:
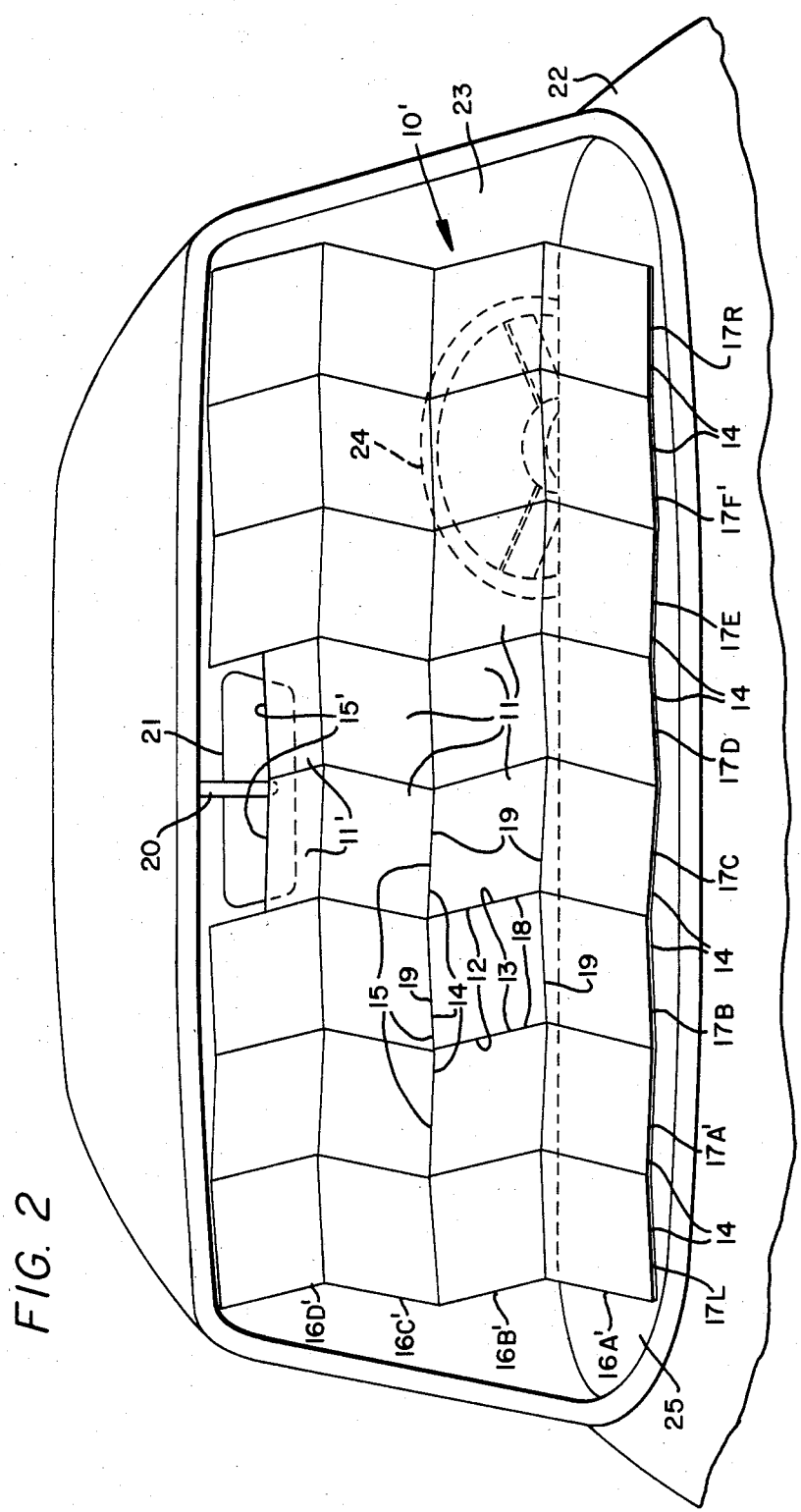

In the drawings:

FIG. 1A represents a perspective view of the sunshade folded to a compact folded state;

FIGS. 1B, 1C and 1D, perspective veiws of the sunshade in progressive states of unfold from the compact storage state of FIG. 1A toward the unfolded expanded state for windshield placement inside a vehicle; and FIG. 2, a perspective front view of the sunshade installed in place behind the windshield of a vehicle.

Referring to the drawings:

The compact fold windshield sunshade 10 is shown to be a single sheet of material (heavy paper, cardboard or plastic) with planar parallelogram segments 11 having spaced parallel opposite side edges 12 and 13, but with these vertically extended side edges at acute and obtuse angles, respectively, relative to each segment generally horizontal bottom edge 14. The opposite side edges 12 and 13 of each segment 11 extend up to a top edge 15. The planar parallelogram segments 11 are arranged in horizontal tiers 16A, 16B, 16C and 16D as shown in the embodiment of FIGS. 1A-1D, (there could be more or less than four tiers 16 for some uses as may be required) and in vertical columns 17A, 17B, 17C, 17D, 17E and 17F (there could be more than six vertical columns 17 such as shown in FIG. 2 with opposite side edge columns 17L and 17R added to provide a wider sunshade 10′). Adjoining parallelogram segments 11 are joined by scored creases, or molded folded lines, 18 and 19 with a degree of resilient bias in the creases, or molded fold lines dependent on whether the sunshade 10 is heavy paper, cardboard or plastic. Fibers in the heavy paper or cardboard are formed into a resilient bias set toward the folded state of FIG. 1A from the unfolded state of FIG. 1D. In like manner if the sunshade 10 is formed from a sheet of plastic long chain molecules through the molded fold lines 18 and 19 also exert some resilient bias from the unfolded state of FIG. 1D toward the folded storage state of FIG. 1A. In spite of this bias toward the folded state particularly with the angled state of the parallelogram segment opposite sides 12 and 13 with bottom and top edges 14 and 15 and the joining fold lines 18 and 19 and because of the bias through the fold lines some of the adjoining segments 11 are snappable through an unstable flat planar state between joined parallelogram segments to a reverse crease bent position holding state.

It should be noted that the top planar parallelogram segments 11′ of the two middle vertical columns 17C and 17D are shorter segments with top edges 15′ cut out lower to accomodate mounting structure 20 of rear view mirror 21, as shwon in FIG. 2, for the sunshade 10′ and in like manner with the sunshade 10 of FIGS. 1A-1D. The sunshade 10′ is shown in FIG. 2 in the expanded unfolded state installed in vehicle 22 behind windshield 23 in a position to shield steering wheel 24 and most of the dash top 25 with some of the adjoining segments 11 snapped through the unstable flat planar state to a reverse crease bent position holding state. In this installed state the upper parallelogram segments 11′ with the cut out down to tops 15′ in columns 17C and 17D extend up to between the mirror 21 and the back of the windshield 23 and the bottom edges of columns 17L, 17A′, 17B, 17D, 17E, 17F′ and 17R rest on dash top 25 to shield much of the vehicle interior from the heat of the sun. Obviously with repeated use of a vehicle during a day a sunshade 10 or 10′ has to be removed and replaced many times. Thus, the facilitated ease of folding and unfolding of the sunshades with the interconnected fold-line parallelogram angle edge construction is a great convenience to the user with the units being quite compact in the folded state for storage and being expandable with unfolding to the installed state being quick and easy. Installation is certainly quick and easy with units being expanded into place as compared to awkward juggling of big segment cardboard sunshield units into place. The sunshade 10' is shown to have horizontal tiers 16A', 16B', 16C' and 16D' since there are additional side edge columns 17L and 17R added over the number of columns 17A-17F in the sunshade 10 embodiment of FIGS. 1A-1D. It should be noted that the side edge columns 17A and 17F of sunshade 10 or 17L and 17R of sunshade 10' could have straight cut outer edges on one or more of the columns without alteration of the basic functioning of such altered segment 11 outer column outer edges as long as the joined inner edges are angled as described.

Whereas this invention has been described particularly with respect to several embodiments thereof, it should be realized that various changes may be made without departure from the essential contributions to the art made by the teachings hereof.

I claim:

1. A compact fold windshade comprising: a single sheet of material including a plurality of planar parallelogram segments having spaced parallel opposite side edges and spaced parallel top and bottom edges and with acute and obtuse angles between segment sides and segment tops and bottoms; said planar parallelogram segments arranged in a plurality of horizontal tiers and in a plurality of vertical columns; and with adjoining planar segments joined through generally horizontal fold lines and through vertically extended fold lines that form acute and obtuse angles with said generally horizontal fold lines.

2. The compact fold windshield sunshade of claim 1, wherein the plurality of vertical columns of said planar parallelogram segments is greater in number than the said plurality of horizontal tiers to facilitate desired shielding behind a vehicle windshield and yet be foldable to a compact storage state.

3. The compact fold windshield sunshade of claim 2, wherein there is a cut out in the top of said sunshade to accomodate rear view mirror structure with the top parallelogram segment of at least one of said vertical columns having a lower top edge than the top edge of the vertical columns that are not shortened and with the top parallelogram segment of the vertical column with a lower top edge being a smaller parallelogram segment than the majority of parallelogram segments in the sunshade.

4. The compact fold windshield sunshade of claim 3, wherein two of said vertical columns are cut out at the top to present a lower top edge in the transverse center of said sunshade with two top parallelogram segments smaller than the other parallelogram segments of the sunshade.

5. The compact fold windshield sunshade of claim 3, wherein said sunshield is foldable to a conveniently compact package for storage with various parallelogram segments overlapping and also extending out one from another.

6. The compact fold windshield sunshade of claim 5, wherein sunshield material through said horizontal fold lines and through said vertically extended fold lines have a resilient bias set toward the folded state from the unfolded state of the sunshield.

7. The compact fold windshield sunshade of claim 6, wherein the resilient bias set toward the folded state through said fold lines enables snapping adjoining parallelogram segments connected through said fold lines through an unstable flat planar state between fold line joined parallelogram segments to a reverse crease bent postion holding state.

8. The compact fold windshield sunshade of claim 7, wherein there are four horizontal tiers of said planar parallelogram segments.

9. The compact fold windshield sunshade of claim 8, wherein there are six vertical columns of said planar parallelogram segments.

10. The compact fold windshield sunshade of claim 8, wherein there are eight vertical columns of said planar parallelogram segments.

11. The compact fold windshield sunshade of claim 9, wherein at least one of said vertical columns presenting an outer side edge of said sunscreen has a straight cut outer edge with the planar segments of that vertical column altered from planar parallelogram segments by having straight cut outer edges at right angles to said spaced parallel top and bottom edges.

12. The compact fold windshield sunshade of claim 10, wherein at least one of said vertical columns presenting an outer side edge of said sun screen has a straight cut outer edge with the planar segments of that vertical column altered from planar parallelogram segments by having straight cut outer edges at right angles to said spaced parallel top and bottom edges.

* * * * *